(12) United States Patent
Kimmel et al.

(10) Patent No.: US 6,464,082 B1
(45) Date of Patent: Oct. 15, 2002

(54) CULLET SORTING USING DENSITY VARIATIONS

(75) Inventors: Kevin S. Kimmel, Brandon, FL (US); Neal A. Hawk, Dresden, OH (US); Meredith A. Keller, Placerville, CA (US); Frank Whitmore, Phoenix, AZ (US)

(73) Assignee: Eftek Corporation, Berlin, NJ (US)

( * ) Notice: Subject to any disclaimer, the term of this patent is extended or adjusted under 35 U.S.C. 154(b) by 0 days.

(21) Appl. No.: 09/594,384

(22) Filed: Jun. 15, 2000

Related U.S. Application Data

(63) Continuation-in-part of application No. 08/915,106, filed on Aug. 20, 1997, now Pat. No. 6,112,903.

(51) Int. Cl.$^7$ ................................................. B03B 7/00
(52) U.S. Cl. .......................... 209/12.1; 209/3; 209/11; 209/38; 209/930; 241/24.22
(58) Field of Search .............................. 209/3, 4, 7, 10, 209/12.1, 11, 21, 30, 38, 39, 930; 241/24.22, 24.14, 19

(56) References Cited

U.S. PATENT DOCUMENTS

| | | | | |
|---|---|---|---|---|
| 3,897,330 A | * | 7/1975 | Rhys | 209/75 |
| 4,583,695 A | * | 4/1986 | Genestie | 241/24 |
| 5,350,121 A | * | 9/1994 | Vitunac et al. | 241/14 |
| 5,950,936 A | * | 9/1999 | Bergart | 241/21 |

* cited by examiner

*Primary Examiner*—Donald P. Walsh
*Assistant Examiner*—Joseph Rodriguez
(74) *Attorney, Agent, or Firm*—Duane Morris LLP

(57) ABSTRACT

Glass cullet such as recycled municipal waste is processed to substantially eliminate contaminants including light weight paper and polymer, ferrous and nonferrous metal and also ceramics, pyroceramics, tempered glass, stones and assorted silicates that have properties approximating those of glass. In a series of washing and sorting steps, different mechanical, chemical, electromagnetic, and thermal processes cause distinct materials in the cullet to react differently, whereupon the contaminants are selectively removed and the glass is processed on. The cullet is crushed; ferrous and nonferrous metals are detected and diverted, a screening station sizes cullet particles and routes larger sizes back for additional crushing. An air blower entrains and removes light fractions and dust. A wash station entrains and removes dirt and soluble material. In a flow of sized particles, further metal and ceramic (non-glass silica) detection devices divert portions of the flow sensed to contain non-glass materials. The non-glass non-metallic contaminants are removed by processing to achieve distinct temperatures and also by sorting as a function of particle density. The respective steps are provided along a continuous series of conveyors between processing stations such that the cullet is processed directly through the steps from the raw to finished product. Clean, dry, sized glass particles, including fine glass powder, is produced and can be used for making new glass products.

6 Claims, 2 Drawing Sheets

CULLET SORTING USING DENSITY VARIATIONS

This application is a continuation-in-part of U.S. patent application Ser. No. 08/915,106, filed Aug. 20, 1997, U.S. Pat. No. 6,112,903.

BACKGROUND OF THE INVENTION

1. Field of the Invention

The invention concerns bulk material sorting methods and apparatus, and in the sorting of materials such as particulate recycled glass from municipal recycling materials.

2. Prior Art

Municipalities routinely collect glass for recycling; however even after substantial washing and sorting steps, the composition of the collected glass is not uniform. Processors attempting to use the recycled glass find, for example, that some of the glass particles melt at a higher temperature than others, which leads to processing problems that render the recycled material unsuitable for certain uses. Recycled glass materials comprise containers and broken glass pieces that are clear (or "flint") or colored, typically amber or green. When collected for recycling, various non-glass contaminant materials are present. Non-glass contaminants having physical properties that are distinctly different than those of the glass can be sorted out by discriminating for differences in properties. For example, metal bottle caps and the like can be removed during crushing and screening steps because metal is malleable and is flattened by crushing, but glass is frangible and breaks into small pieces that can be screened. Ferromagnetic metals can be removed magnetically. Contaminants such as organics, dirt, paper from labels and the like can be removed by washing, rinsing and filtering steps. Plastics are generally less dense than glass and can be removed by rinsing, skimming or winnowing steps.

A greater problem is confronted in attempting to sort out materials that have properties that are quite similar to those of glass. Occasional pieces of ceramics, pyroceramics (e.g., Corning Corelle ware), tempered glass (e.g., Corning Pyrex glass), stones and other materials are frequently present in the recycled cullet. These contaminants are not readily distinguishable from glass by their physical properties, which in many respects resemble the properties of glass. Most sorting techniques are not effective to detect and remove them because their physical, electrical and chemical properties are substantially the same as those of glass. Recycling authorities accordingly may instruct consumers to recycle only glass food and beverage containers, and not (for example) glassware, crystal, ceramics, plate glass, mirrors and the like. Inevitably some of these materials find their way into recycled glass.

Contaminants can cause difficulties in processing cutlet into new glass. The recycling process typically includes comminuting the glass into relatively small particles that are processed in bulk. Particles that have properties that are distinct from those of the other particles represent defects in the bulk material. For example, ceramics and tempered glass have a higher melting temperature than glass, such that they may not melt completely and/or mix homogeneously in remelted glass. The result may be localized defects in molded recycled glass, clogging of spinnarettes used to make fiberglass from recycled glass, and other problems. For these reasons, recycled glass may be relegated to uses taking negligible advantage of its properties, such use as a filler in paving material. On the other hand, it is impractical or impossible to manually pre-sort cutlet effectively before comminution or breakage.

Many types of materials are recycled, such as glass, plastic, paper and metals, often in mandatory programs intended to reduce waste and conserve landfill space. A municipality may require that recycled materials be sorted manually into different containers that are dumped into different receptacles upon collection. More often, there are too many categories to justify segregation of each variety of material through the process. Typically glass, plastic and metal are collected together for later sorting. Even if an attempt is made to sort by material, consumers cannot be expected to be sensitive to a difference in types of glass, and may commingle distinct materials inadvertently.

Recyclables collected in commingled collection programs need to be sorted during further processing if a relatively pure material is needed, for example to make new glass containers or the like from the recycled ones. Manual sorting is possible but tends to be prohibitively expensive, and the most careful sorting can be ineffective when much of the glass is broken. Due to the inability to sort types of glass and to separate glass and non-glass materials, recycled glass cutlet often is not used to make new glass, and is substantially less valuable than material that is more pure. For example, recycled glass cullet of moderate particle size may be used as an aggregate or filler in roadway paving. Smaller particles may be used as "sand" for golf course bunkers. Although these uses are not insubstantial, the economic and product purity issues are such that approximately 85% of recycled mixed cullet goes into landfills.

There can typically be up to 10% contaminants in recycled glass material, i.e., 200 lbs. per ton. It would be advantageous if recycled glass could be sorted more effectively to remove non-glass materials, ceramics, pyroceramics and tempered glass.

In addition to avoiding waste of material, glass cullet liquifies at a lower temperature than new glass batch, and has favorable viscosity characteristics. Less heat energy is necessary to melt cullet than new batch, reducing costs and environmental emissions. Processing time is reduced, improving productivity. It would be advantageous to use recycled glass to make new glass containers, fiberglass and other products in order to conserve resources and reduce costs.

For all these reasons, it would be advantageous to provide a more practical technique to distinguish and sort glass and non-glass materials having properties similar to glass, which can be operated on a production scale. The present invention provides a method and means for distinguishing and substantially removing various contaminant materials by taking advantage of their different mechanical, electromagnetic, and thermal characteristics.

SUMMARY OF THE INVENTION

The invention concerns bulk material sorting methods and apparatus, and in particular to sorting materials such as particulate recycled glass.

More particularly, the invention is an apparatus, system, and method for sorting a stream of mixed particulates of at least two distinct materials having different mechanical, chemical, electromagnetic, and thermal characteristics, especially different characteristics between particulate glass and contaminants such as pieces of polymer, metal and metallics, ceramics, pyroceramics, tempered glass, and stones and assorted silicates. The system of the invention comprises a series of sorting and refining stations that are adapted to separate the cullet into useable glass and non-glass debris, comprising of a cullet intake station, a metal sorting station, a screening station, a crushing station, vacuuming equipment, a wash station, a shaker-feeder station, a drying station, a metal detection and removal station, and a ceramic detection and removal station, a pulverizing station, a multi-deck screening station, and a loading and storage station. Typically, the unsorted particulate material is collected in a thick mass and moved, from station to station, by a series of conveyors.

First, a stream of mixed particulates is delivered from the intake station to the metal sorting station where a magnetic separator separates the mixed particulates into a magnetic fraction and a non-magnetic fraction. The non-magnetic fraction is further divided into a coarse component and a fine component at the screening station. The resulting coarse components are further crushed and admixed with the fine component at the crushing station. A series of vacuuming equipment operates to remove air-borne chaff from the non-magnetic fraction.

The resulting non-magnetic particulates continues through this system to the washing station. After the washing stage, the particulates are delivered to the shaker-feeder station where a vibrating conveyer and a vibrating perforated deck removes bulk moisture from the particulates. The washed particulates are further dried by going through the drying station. The substantially dried particulates then move through the metal detection and removal station where a separation of non-magnetic metal particulates from the non-magnetic fraction occurs. At this point of the process, all of the metallic particulates have been removed.

The resulting particulates then go through a ceramic detection and removal station where particulates having non-glass characteristics are separated from particulates having characteristics of glass. At this point, the resulting glass material is clean, dry and pure and can be used to make glass products.

After passing through the ceramic detection and removal station, the resulting glass material can be further refined and divided by a pulverizing station and a multi-deck screening station. As an alternative to the multi-deck screening station, a density separation station can be used to further refine the material. The final product is a clean, dry, and fine granular glass powder which can be used for making glass products. The resulting physical properties of the glass powder are such that the glass powder acts as a flux and melts at lower temperatures thus requiring less power for making glass compared to regular raw glass material. This product also has 0% fusion loss compared to 15% fusion loss for regular raw glass material.

Additional aspects and objects of the invention will be apparent in connection with the following discussion of practical examples.

BRIEF DESCRIPTION OF THE DRAWINGS

Shown in the drawings are exemplary embodiments of the invention as presently preferred. It should be understood that the invention is not limited to the embodiments disclosed as examples, and is capable of variation within the scope of the appended claims.

In the drawings.

DETAILED DESCRIPTION OF THE PREFERRED EMBODIMENTS

Figure 1:
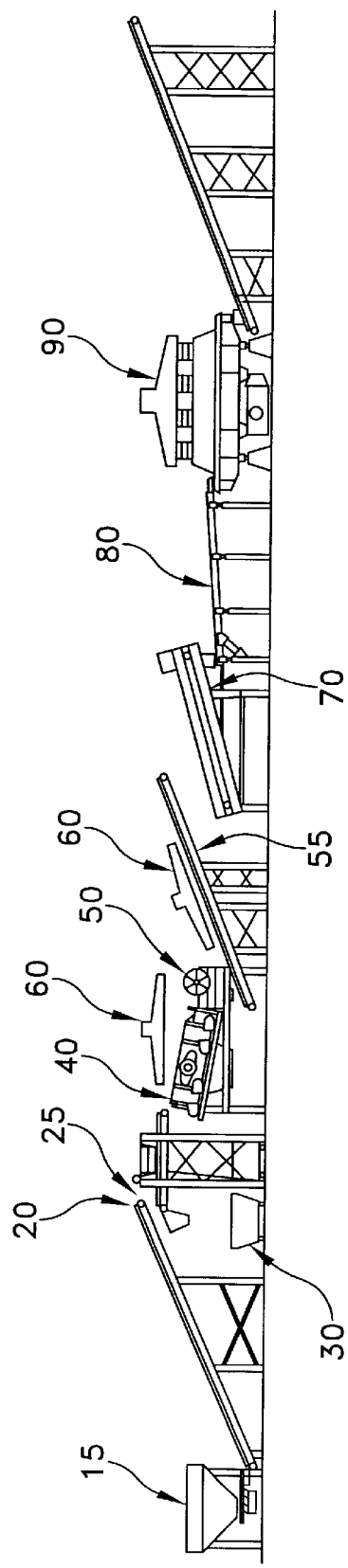
FIG. 1 is a schematic elevational view showing some of the stations of the cullet sorting system formed in accordance with the present invention.

Certain specific terms are used in the following description for clarity, but these terms refer to the particular structure of the invention selected for illustration in the drawings, and are not intended to define or limit the scope of the invention to the specific device described and shown.

As shown generally in FIG. 1, cullet sorting according to the system of the invention comprises, in combination, a cutlet intake station, a metal sorting station, a screening station, a crushing station, vacuuming equipment, a wash station, a shaker-feeder station, a drying station, a metal detection and removal station, and a ceramic detection and removal station, a pulverizing station, a multi-deck screening station, and a loading and storage station. Typically, the unsorted particulate material is collected in a thick mass and moved, from station to station, by a series of conveyors. The preferable processing speed is 30 tons per hour at the intake station.

First, an intake station 10 typically consists of an intake hopper 15 and a manually operated front end loader (not shown) consistently feeding the hopper 15 so that the hopper maintains a consistent level of mixed particulates. Then the stream of mixed particulates is delivered from the intake station 10 to the metal sorting station 20 where a magnetic separator 25 separates the mixed particulates into a magnetic fraction and a non-magnetic fraction. This is the first of many stages of metal separation.

The magnetic fraction is discharged to a typical container 30 and the non-magnetic fraction is further divided into a coarse component and a fine component at the screening station 40 where components bigger than 2.25 to 2.5 inches are separated from the smaller components. The screening station 40 is typically a dual deck incline classifying screen. However, other multi-deck classifying screens can be utilized just as effectively.

The resulting coarse components are further crushed and admixed with the fine component at the crushing station 50. Typically, a relatively simple single toggle jaw crusher would suffice. After the components pass through the crusher, the size of the components will be somewhat uniform. Because the components are subjected to vibrating and agitating action while going through the screening station 40 and the crushing station 50, much separation occurs between light and heavy components.

Therefore, using vacuuming equipment 60 to collect and discharge light air-borne chaff is desired. Typically, an overhead type of vacuuming equipment 60 placed above the screening station 40 and the crushing station 50 would be ideal for this process. Additional vacuuming equipment 60 operates to remove the air-borne chaff from the non-magnetic fraction while the fraction is being transported by a conveyer 55 from the crusher 50 to the washing station 70. The air-borne chaff typically consists of paper, plastic, dust and other light materials.

The resulting non-magnetic particulates continues on through this system onto the washing station 70. The washing station 70 is typically a closed-loop system with multiple screens, operating optimally in the range of 150° F. to 170° F. The temperature should be at least 130° F. and preferably over 150° F. Additionally, some type of detergent should be used. Typically, 1% caustic solution such as sodium hydroxide will be ideal. During the washing stage, vibrating water action agitates the particulates and thereby loosens solid debris such as label glue, paper fiber and food. Filters are utilized to keep the circulating water clean and also to remove fine dust and debris. After a thorough washing process, the particulates are then rinsed in a monolayer with clean water.

After the washing stage, the particulates are transported by a vibrating conveyer 75 through the shaker-feeder station 80 where a vibrating perforated deck removes bulk moisture from the particulates. The purpose of the shaker-feeder station 80 is simply to remove bulk moisture from the particulates before subjected to forced hot air during the subsequent drying stage. The shaker-feeder 80 significantly increases the efficiency of the subsequent drying station 90.

The washed particulates from the shaker-feeder station 80 are further dried by going through the drying station 90. Typically, the drying station 90 is a vibrating, forced hot air, fluidized bed using a gas or oil fired heat source. As an example, a 1.5 MBTU gas-fired heat source would be sufficient for this process. The fluid bed dryer 90 which has a perforated stainless steel deck, operates optimally with a supply of forced air from 180° F. to 200° F. which should maintain operating temperature of the dryer from 140° F. to 180° F. After the particulates pass through the drying station 90, the particulates are substantially dry with a 0.25% maximum moisture content.

Maintaining the dryer temperature between 140° F. and 180° F. is critical in order to minimize the energy consumed during the microwave heating stage of the ceramic detecting process. After drying, the cutlet maintains a pre-heating temperature due to the residual heat from the drying process. It has been determined that the pre-heating temperature of the washed and dried cullet has an effect on the subsequent microwave heating process. Generally a pre-heating temperature in the range of 140° F. to 180° F. provides the largest resulting temperature differences between the glass particles and contaminants in the cullet after microwave heating.

Figure 2:
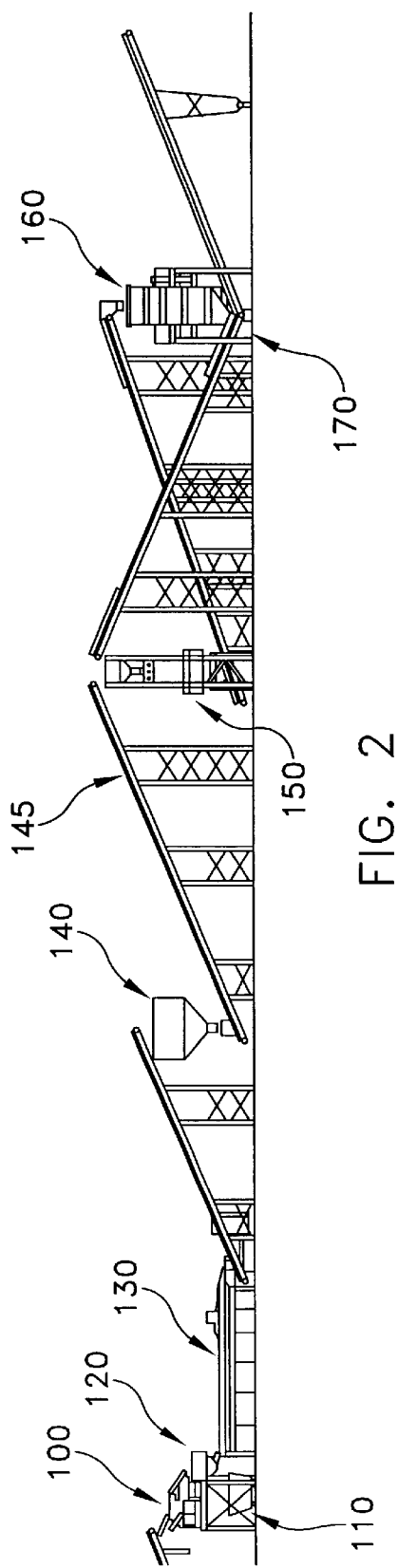
FIG. 2 is a schematic elevational view showing additional stations of the cullet sorting system shown in FIG. 1.

As shown in FIG. 2, the substantially dried particulates then move through a second metal detection and removal station 100 where a separation of non-magnetic metal particulates from the non-magnetic fraction occurs. The non-magnetic metal fraction is discharged to a typical container 110 and the non-magnetic fraction continues to a small accumulator hopper 120 and then to the next station 130, where ceramic detection and separation occurs. At this point of the process, all of the metallic particulates have been removed.

The resulting particulates then go through a ceramic detection and removal station 130 where particulates having non-glass characteristics are separated from particulates having characteristics of glass. The resulting particulates which consist of recycled glass cullet including fragments of glass mixed with fragments of glass-like contaminants such as ceramics, pyroceramics, tempered glass or the like, have different induction heating characteristics (i.e., distinct thermal, dielectric strength and/or loss tangent characteristics).

These particulates are sorted using the differing characteristics of the glass and contaminants to cause detectable differences in temperature. A thick heating layer many particles deep is formed on a conveyor path for heating the stream in a compact mass for uniform heating. An electromagnetic induction heater applies microwave energy between 0.915 and 2.45 GHz for heating the mass, which is then spread into a thin detecting layer, for example one particle deep, on a further conveyor. The detecting layer is digitally imaged using a thermal camera. The thermal image data is analyzed for temperature differences, particularly for temperature differences from an average temperature computed for discrete lateral lanes. A downstream diverter mechanism is triggered to divert incremental portions of the material stream found to contain temperature differences, thereby removing the contaminants. At this point, the resulting glass material is clean, dry and substantially pure and can be used to make glass products.

After passing through the ceramic detection and removal station 130, the resulting glass material can be further refined by a pulverizing station 150. From the ceramic detection and removal station 130, the glass material can be transported to an accumulator hopper 140, preferably 15 ton, and then to the pulverizing station 150 for further refinement. Additionally, the feed rate of the conveyer 145 from the accumulator hopper 140 to the pulverizer 150 is made dependent on the pulverizer motor load in order not to overload the pulverizer. The pulverizing station 150 is typically a centrifugal type using a glass on glass action to pulverize the glass material into fine powder. For further refinement and separation, the resulting glass material can be processed by either a multi-deck screening station 160, or a density separation station 170.

After passing through the pulverizing station 150, the resulting glass material can be further divided by a multi-deck screening station 160. The multi-deck screening station 160 is preferably a three-deck screening station with fine, intermediate and coarse screens. Typically, 12 mesh screens are used for the fine, sand-like glass, ¼ inch screens are used for the intermediate-sized glass, and finally ¾ inch screens are used for the coarse glass. The coarse glass is cycled back to the pulverizing station 150 where it is pulverized with other incoming glass materials.

An alternate method for further refinement after the pulverizing process, preferably in addition to the foregoing sorting steps, is a step of non-glass particle separation as a function of sorting for density. In particular, the cullet material as previously treated for removal of metallic materials, dirt and the like, is sorted for density to concentrate and remove non-glass contaminants such as ceramics, stones, tempered glass, pyrocerams and similar materials that resemble glass in their physical attributes but are relatively more dense.

Density separation can be accomplished to separate finely divided particles having different specific gravities, carried in a gaseous, liquid or bulk suspension. Commingled particles of relatively higher and lower densities can be suspended in bulk or in a slurry to which a force is applied while the particles are mobile in the suspension. The higher density particles displace lower density particles under action of the force, and are separated by diverting a portion of a flow or skimming or bottom draining the bulk suspension. Similarly, particles sorted for a uniform size can be winnowed to separate higher and lower density particles into separate streams.

The applied force can be gravity, centripetal acceleration or the like. In a preferred recycled glass process, density separation is used as part of a series of sorting steps to further system to separate glass particles from included contaminants such as ceramics, tempered glass, brick or mortar particles, stones and the like, even though such contaminants are similar to glass except for the density of their material.

In the preferred embodiment shown, the density separation station 170 separates the resulting glass stream from the pulverizing station 150 to provide one or more streams in which the particles are of a substantially uniform screen size or mesh size. Particles of a similar size preferably are matched with like screen size or mesh size particles from other sources. Less preferably, a range of particle sizes can be treated together. The material is fed over a screen having an appropriate mesh size to admit the contaminant particles of interest. The material is fed over the screen at a steady rate, with a specified volume and pressure of gas (e.g., air) introduced on the back side of the screen upon which the material is being fed. This tends to fluidize the particles and to render individual particles mobile in the mass due to agitation. Preferably, the screen is agitated mechanically and is inclined relative to horizontal such that the agitated and fluidized material flows over the screen. As the material flows over the screen, particles which are more dense move downwardly in the mass as compared to less dense particles. The dense particles pass through the screen as the less dense particles flow over the screen.

A mix of more and less dense particles can be sorted in this manner into streams, and those streams can be subjected to further similar passes through the density sorting apparatus. Over a period of time and preferably through successive passes through the density sorting apparatus, the concentration of more-dense particles increases in the stream(s) that have passed through one or more screens and the concentration of less-dense particles increases in the stream (s) that have passes over the screens in one or more passes. The particles are thus separated and collected. With sufficient treatment a quantity of substantially pure glass material is obtained free of all the relatively more dense contaminants.

The density separation process can be a wet or a dry process. Material which has been sorted of dense particles using the density separation process, or material that has passed over a density separation screen can be fed back into the product stream that results from the pulverizing process, for repeated separation passes. Preferably, the material is processed through successive passes to remove relatively dense particles and through successive steps to concentrate as much of the high density particles as possible in a waste stream and at the same time to remove as much as possible from the selected stream.

Density separation processing is preferably accomplished at each of a plurality of screening steps. The product produced by pulverizing station 150 is separated individually by the successive mesh sizes, for example mesh sizes 10 by 14, 14 by 20, 20 by 28, and 28 by 35. Material over 10 mesh size is recirculated for further comminution and reduction or is processed separately as determined by customer requirements. Each of the sized streams is fed over their respective screens as described, to complete the process of removing contaminants.

Whether using the multi-deck screening station 160 or the density separation station 170 for further refinement of the glass material, the resulting final product is a clean, dry glass which can be used for making glass products. Preferably, the finest screen product comprises fine granular glass in a powder form. The physical properties of the glass powder are such that the glass powder can be used as a flux or frit and melts at relatively lower temperatures. This product also has little or no fusion loss, as compared to 15% fusion loss for regular raw glass material.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A method for separating mixed particulates containing recycled glass, which comprises the steps of:

separating out ferrous metal from the mixed particulates by delivering the mixed particulates to a magnetic separator; separating the mixed particulates into a magnetic fraction and a non-magnetic fraction and removing the magnetic fraction;

dividing the non-magnetic fraction into a coarse component and a fine component; crushing particulates in the coarse component and admixing them with the fine component so as to render the non-magnetic fraction into components of a relatively uniform size;

separating out light and low density material by applying an air flow to the non-magnetic fraction after said crushing, to entrain and remove air-borne chaff;

separating out soluble fractions by washing the non-magnetic fraction in a washing solution after said separating by air flow, to entrain and remove soluble and water borne fractions; and drying the washed particulates;

separating out non-magnetic metal particulates from the non-magnetic fraction;

wherein said separating and dividing steps produce a fraction substantially consisting of glass and non-glass contaminants having selective characteristics that resemble but are distinguishable from glass; and, lastly, separating out the non-glass contaminants having said selective characteristics, whereby the remaining fraction consists essentially of glass wherein said selective characteristics are substantially uniform.

2. A method as defined by claim 1, wherein the step of separating out light and low density material comprises applying air flow to the non-magnetic fraction to remove air-borne chaff using at least one overhead vacuum hood to draw said air flow through the non-magnetic fraction.

3. A method as defined by claim 1, wherein the step of separating non-magnetic metal particulates from the non-magnetic fraction is carried out by a non-ferrous metal detection station with at least one stage of detection.

4. A method as defined by claim 1, wherein at least part of the non-glass contaminants are distinguishable by density, and wherein the step of separating out the non-glass contaminants having said selective characteristics comprises screening the pulverized glass fraction in conjunction with a separating step wherein a density separation station utilizes a plurality of screen sizes for sorting and also subdivides the pulverized glass fraction into particles of distinct densities.

5. A system for separating mixed particulates of which a portion is recycled glass and is mixed with waste portions including non-glass contaminants having selective characteristics that resemble but are distinguishable from glass, the system comprising sequential operations and including:

means for delivering the mixed particulates to a magnetic separator;

at least one separating station operable to separate the mixed particulates into a magnetic fraction and a non-magnetic fraction;

a separating station which divides the non-magnetic fraction and divides it into a coarse component and a fine component wherein the separating station passes the coarse component through a crusher operable to receive and crush the coarse component and wherein the separating station admixes an output of the crusher with the fine component to provide material with a relatively uniform reduced particle size;

at least one air flow station positioned along a flow path of the non-magnetic fraction and which applies and air flow to said fraction to entrain and remove light and low density material as air-borne chaff;

a washing station which receives and washes the non-magnetic fraction in a washing solution, thereby separating out soluble fractions;

a non-magnetic metal separation station operable to remove remaining metal particulates;

wherein said separating, washing and separation stations pass material containing non-glass contaminants having selective characteristics that resemble but are distinguishable from glass; and, a further separating station disposed to operate on the material containing the non-glass contaminants after passing said separating, washing and separation stations, which separates out particulates having said selective characteristics, whereby a remaining fraction consists essentially of glass wherein said selective characteristics are substantially uniform.

6. A system as defined by claim 5, wherein the screening station which screens the pulverized glass fraction comprises a density separation station utilizing a plurality of screen sizes for separating the pulverized glass fraction into particles of uniform size, the density separation fluidizing the particles and applying a force to the particles whereby relatively dense particles including at least part of the non-glass contaminants are selectively removed.

* * * * *